United States Patent [19]

Bundens et al.

[11] 4,322,854
[45] Mar. 30, 1982

[54] DATA COMMUNICATIONS TERMINAL

[75] Inventors: Allan B. Bundens, 1831 Clear Creek La.; Carl F. Schoeneberger, 2032 Christie La., both of Carrollton, Tex. 75007

[73] Assignees: Allan B. Bundens; Carl F. Schoeneberger, both of Carrollton, Tex.

[21] Appl. No.: 40,472

[22] Filed: May 18, 1979

[51] Int. Cl.³ .......................... H04B 3/02; H04N 7/10
[52] U.S. Cl. .......................................... 455/5; 455/6; 178/63 R; 358/86
[58] Field of Search .......................... 455/3, 4, 5, 6, 2; 178/63 R, 63 A, 63 B, 63 C; 358/86, 84, 114, 116, 117

[56] References Cited

U.S. PATENT DOCUMENTS

| 3,806,814 | 4/1974 | Forbes | 455/5 |
| 3,886,302 | 5/1975 | Kosco | 455/5 |
| 4,090,220 | 5/1978 | Gargini | 455/5 |
| 4,156,847 | 5/1979 | Tazawa | 455/5 |

OTHER PUBLICATIONS

Two-way Applications For Cable Television System in the 70s, By R. Jurgen, IEEE Spectrum Nov. 1971, pp. 39-54.

Primary Examiner—Tommy P. Chin
Attorney, Agent, or Firm—Hubbard, Thurman, Turner, Tucker & Glaser

[57] ABSTRACT

A data communications terminal is provided for interfacing with a central data processing system to handle a variety of data acquisition and control functions including the monitoring and control of security devices and pay television receivers. The terminal includes a microcomputer unit for receiving and processing data from the central processing system and from remote units which generate data signals in response to abnormal conditions. A data reception and transmission unit include a radio frequency modem for converting data to and from a frequency modulated format and a data converter for changing the serial bit data to parallel word data. An identification unit provides data to the microcomputer regarding the identification of the terminal which can be compared to the address portion of the incoming data from the central processing system. Data generating means are provided for generating and transmitting response data to the microcomputer for transmission to the central processing system. An address decode unit identifies and actuates the various element in this system. The remote data terminal functions in an "interrupt" mode with relation to the central data system so that it communicates with the central data system only when abnormal conditions are detected. Otherwise, the terminal handles its own internal monitoring and control functions. Transmission of data to and from the terminal is preferably along coaxial cable. When used in conjunction with a television receiver, the same coaxial cable may be used for the transmission of television signals to the receiver. In this mode, the terminal includes a television port unit which is activated by the microcomputer to enable access by the receiver to the cable television network in response to appropriate authorization data from the microcomputer.

17 Claims, 7 Drawing Figures

DATA COMMUNICATIONS TERMINAL

BACKGROUND OF THE INVENTION

This invention relates to a remote terminal for data communication systems. More particularly the invention is concerned with remote terminal apparatus for use in connection with a coaxial cable television signal distribution system.

In cable television systems, data signals and television program signals are communicated between a central data processing system and a plurality of remote data terminals each at a subscriber's location. Typically, the terminals provide security monitoring functions by generating status and alarm data to be directed to the central processing system over coaxial cable or by other communication means. In controlling security operations, such terminals typically monitor and report on the status of various alarm indicators including those for fire, medical emergency, intrusion, assault, supervisor fault, tamper and battery low condition. In the cable television program mode, the terminals enable remote television units to receive and descramble television program data from a central television network upon proper authorization from the central processing system for the subscriber. The terminals also can be designed to provide data to the central processing system concerning the selected TV receiver channel and the status of the TV reception.

In the last few years, many new applications have become feasible for cable television systems requiring more sophisticated and efficient systems and system components than previously available. New data processing systems have been developed as disclosed in our co-pending patent application Ser. No. 40,446 (nonessential subject matter) to accommodate these new applications and to provide general purpose data acquisition and control functions in addition to security and pay television operations. This expanded variety of cable usage requires terminal development beyond past passive systems which only monitor security and TV sensors and provide whatever information is requested from the central processing system. Such conventional terminal units do not have the efficiency necessary to be compatible with these more sophisticated data communications systems and to provide the data processing functions needed to free the central processing systems for overall management functions.

SUMMARY OF THE INVENTION

The present invention provides an interactive terminal which has the ability to sense information that would otherwise be monitored by the central processing unit and to communicate with the central processor only if some action is required. The interactive terminal of the present invention monitors basic security and data functions and determines the type of service needed. Interrupt-type signals are then generated to inform the central processor of the action needed. In this manner the central processor is relieved of much of the monitoring otherwise required.

In a preferred embodiment of the present invention a remote user terminal is provided for use in a cable system. The terminal includes a microcomputer unit for receiving and processing data from the central processor and from various alarm sensing units and for generating data signals in response to abnormal conditions. An addressing decode unit defines the elements of the user terminal for the microcomputer and enables access to all of the elements along a common data bus. A communication unit is provided for receiving and transmitting data between the central processor and the terminal and for converting the data from a serial to parallel format for utilization by the microcomputer. Alarm units are provided having data generating sensors and circuitry for reading the data in and out of the terminal system, and identification circuitry provides data for identifying the terminal to the central processor.

For a better understanding of the present invention together with other and further objects and features thereof, reference is made to the following description taken in conjunction with the accompanying drawings.

DESCRIPTION OF THE ILLUSTRATED EMBODIMENT

Figure 1:
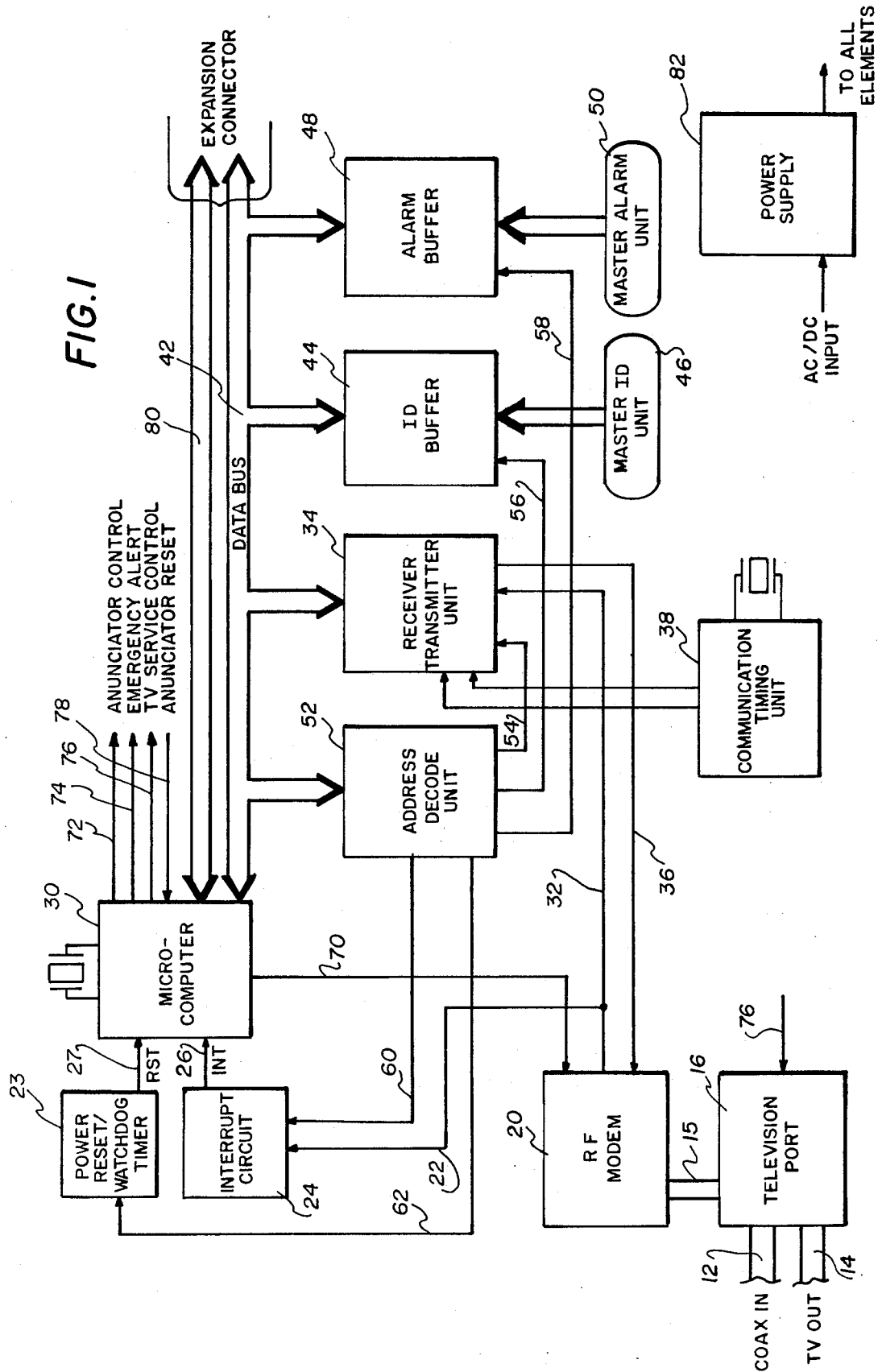
FIG. 1 is a system block diagram of a preferred embodiment of a data processing terminal according to the present invention.

Referring now to FIG. 1, a system 10 is shown as a preferred embodiment of the present invention. The remote terminal system utilizes a microcomputer to provide compact size and a higher level of intelligence than achieved with conventional relatively inexpensive terminals. The modular nature of the terminal system readily enables additional apparatus to be added to provide additional functions for the system. The terminal system shown normally communicates from remote locations through a bi-directional coaxial cable system with a central processor or a remote data processor which is part of a general data communications network. Each terminal system has a unique address that allows the central processor to request the status of a plurality of alarm monitoring inputs every few seconds. The terminal systems are also designed to accommodate the input and output of a wide variety of data which may be used in consumer polling, shopping and advertising feedback, as well as in monitoring and controlling access to TV channel usage, meter readout and energy management and other sophisticated applications of cable systems.

Information is received by system 10 through coaxial input and output data links 12 and 14 to a conventional television port unit 16 which is activated and deactivated by commands from the central processor unit. The central processor preferably uses both time and frequency division multiplexing procedure to communicate with terminal 10 and many other terminals. Each terminal is assigned an identification code and a response frequency to coincide with these multiplexing functions.

An example of a sophisticated multiplexing system is disclosed in our copending patent application Ser. No. 40,466 (nonessential subject matter). From the port unit 16 the data is then transferred along a coaxial bus 15 to a radio frequency modem unit 20 which interfaces with the central processor and converts the data to a suitable format for terminal usage. Modem 20 is connected by transmission line 22 to interrupt control circuitry 24. This circuit generates an interrupt signal when data is received from the central processor through RF modem 20. The interrupt signal is transmitted along line 26 to a microprocessor 30 which is the center of the terminal system 10.

A second input is directed to microcomputer 30 by a power reset/watchdog timer circuit 23 along a reset line 27. A reset signal is sent to microcomputer 30 by circuit 23 when power to the system is turned off or on. In addition, the watchdog timer portion of circuit 23 monitors periodic pulses from microcomputer 30 along transmission line 62 which indicates that the system 10 is in proper functional order. If a pulse is not received by circuit 23 within a predetermined period of time, the circuit generates a reset pulse along line 27 to reset microcomputer 30.

The input data is transmitted along line 32 to a receiver/transmitter unit 34. This unit is preferably a universal asynchronous receiver/transmitter (UART) which converts serial digital data to parallel data words which can be utilized by the microprocessor 30. Likewise, UART unit 34 converts outgoing parallel data to serial digital data for transmission along line 36 to the RF modem 20 to be transmitted to the central processing unit. Conventional communication timing circuitry 38 provides timing pulses to receiver/transmitter 34 which are generated by a crystal controlled oscillator 40.

Receiver/transmitter 34 communicates the converted data to micro-computer 30 over the main data bus 42 connecting these two units and other major units of system 10. An identification buffer 44 is also connected to main data bus 42 to enable microcomputer 30 to identify the terminal so that a determination can be made as to whether terminal 10 is being addressed by the central processing unit. Buffer 44 is connected to a master identification unit 46 having a unique identification code therein. The identification code data is accessed by microcomputer 30 through buffer 44 and is compared to the identification portion of the incoming data to make the identification determination. An alarm buffer 48 is also connected to common data bus 42 and receives input data from a master alarm unit 50 comprising a plurality of data generating sensors. This alarm data is also transmitted to microcomputer 30 over data bus 42 for appropriate processing.

An address decode unit 52 is also connected to the main data bus 42 and serves to define each of the elements of system 10 and to activate and deactivate these elements in response to control data from microcomputer 30. Decode unit 52 is preferably a strobed latched decoder and is connected to receiver/transmitter 34, identification buffer 44 and alarm buffer 48 by transmission lines 54, 56 and 58 respectively for the purpose of activating and deactivating those units. Decode unit 52 also transmits control signals to interrupt control circuit 24 along transmission line 60 and to power reset/watchdog timer circuit 23 along transmission line 62.

In addition to main data bus 42, microcomputer 30 also provides a plurality of control outputs for various elements in system 10. An enable pulse is provided along a transmission line 70 to RF modem 20 in order to activate the modem transmitter. A control pulse is also provided along output line 72 for turning on an appropriate conventional anunciator in response to the detection of an alarm data input. Another output transmission line 74 provides an emergency alert control signal coming from the central processor to activate various emergency warning devices. Other control signal output is provided along line 76 to TV port 16 to enable reception of transmitted television signals by a television receiver along coaxial cable 14. Finally, an input transmission line 78 connected to appropriate anunciator circuitry transmits a reset control signal to microcomputer 30 when the anunciator is to be reset.

In addition to the foregoing, a second major data bus 80 is provided to enable further compatible expansion of the functions of microcomputer 30 for some of the other data acquisition and control functions mentioned earlier. A conventional power supply 82 having AC/DC inputs provides the necessary power requirement for terminal 10 and also activates one of the alarm inputs in alarm unit 50 when power is low or fails.

In one preferred embodiment of the foregoing system 10, microcomputer 30 comprises a one chip microcomputer including a random access memory having 64 bytes and a read-only memory having 1024 bytes storage. A compatible microcomputer chip is the 8048 or 8748 chip available through Intel Corporation. In this preferred embodiment, receiver/transmitter 34 is a UART unit, model No. IM6402, provided by Intersil Corporation. The communications timing unit 38 comprises a model 74LS161 chip made by Texas Instruments and driven by a 3.58 megahertz crystal controlled oscillator. The address decode unit 52 is a MC14515B decoder unit made by Motorola Corporation.

The alarm input unit 50 is preferably a plurality of control switches arranged to monitor various security and process functions. In one preferred embodiment, the switches are resistance-controlled switches connected to a sensing wire having an established resistance. If the resistance substantially changes, the resistance control switches detect the abnormal condition and direct a pulse to alarm buffer 48 which relays the data to microcomputer 30.

Simarily, the identification master unit 46 is preferably a group of switches or relays which can be set to provide a unique identification code for terminal 10. This code is output through buffer 44 to data bus 42 for reception and processing by microcomputer 30.

Figure 2:
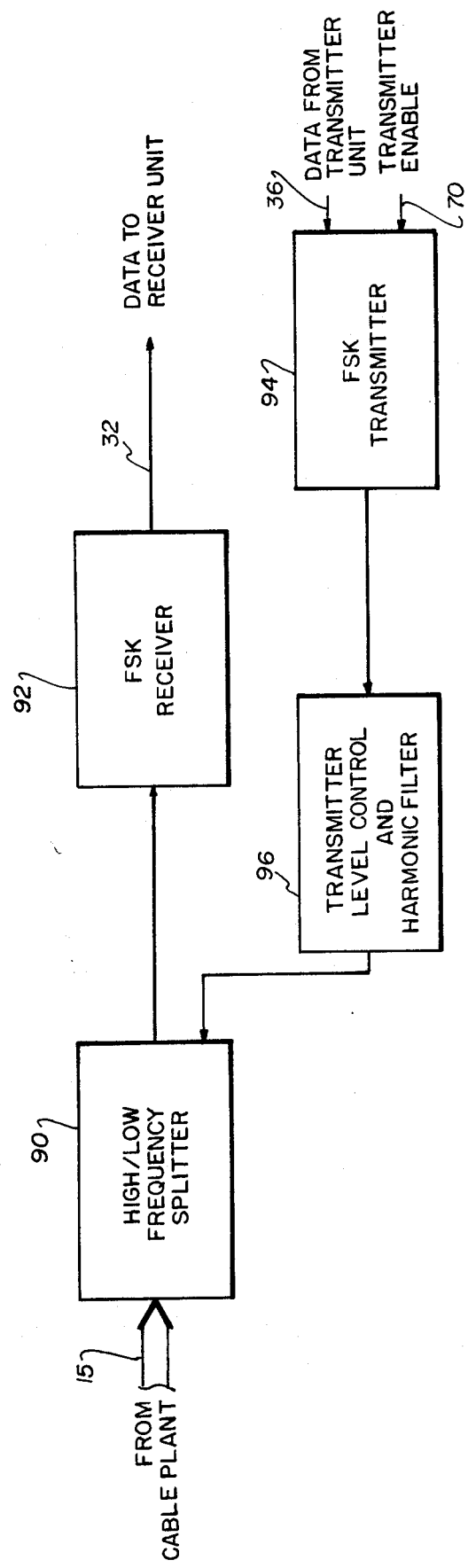
FIG. 2 is a block diagram of the RF modem shown in FIG. 1.

Referring now to FIG. 2, RF modem 20 is shown in greater detail. Incoming signals on coax cable 15 are preferably frequency modulated signals having a frequency shift key mode. The signals have been generated by a similar RF modem unit in the central data processing unit upstream along coax cable 15. The data signals are first input to a frequency splitter circuit 90 which separates incoming data having different frequencies. The incoming data is directed to an FSK receiver unit 92 which converts the data to a digital format for internal use by the terminal logic. The digital data is then output on transmission line 32 to UART 34.

Data coming from UART 34 along transmission line 36 is directed to an FSK transmitter circuit 94 which converts the digital data to frequency shift key form at the designated carrier frequency of the terminal. The data is then passed to a level control and filter unit 96 which monitors and controls the level of transmitter power and filters out unnecessary harmonics in the signal. From control and filter unit 96 the outgoing data is directed to frequency splitter 90 which in turn passes the data on to coaxial cable 15 which also carries the incoming data from the central processor.

It is understood that the incoming data from the central processor is transmitted at a different frequency than the outgoing data from the terminals. In one preferred embodiment, incoming central processor data is frequency shift keyed at about 158.55 megahertz. The outgoing data from a plurality of terminals like terminal 10 in a given terminal group are each modulated about a different frequency. In a preferred embodiment, the terminal frequencies range between 18.2 and 30 megahertz. As an example, the return frequency for RF modem 20 may be set at 18.2 megahertz.

Additional control inputs are fed to FSK transmitter 94. An enable signal is processed from microcomputer 30 along line 72 to enable the operation of transmitter 94. FSK receiver 92 and FSK transmitter 94 are both similar to conventional units widely available in the marketplace, as are splitter circuit 90 and control and filter unit 96.

Figure 3:
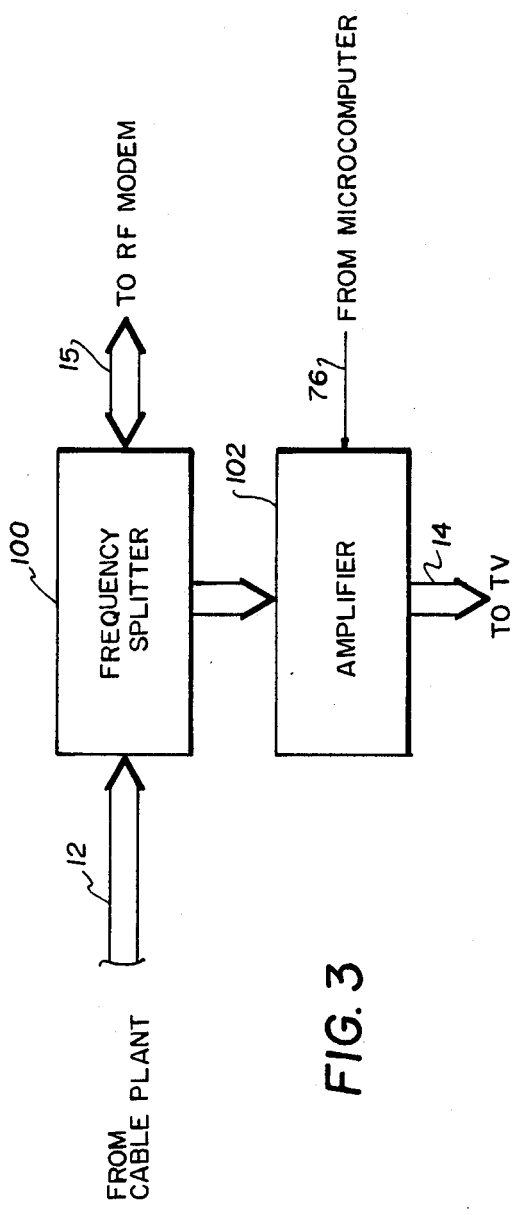
FIG. 3 is a block diagram of the television port shown in FIG. 1.

Television port 16 is shown in FIG. 3 in greater detail. The port includes a frequency splitter for separating input and output control data from input television signals on coaxial cable 12. The control data is processed in and out over line 15 to RF modem 20 while the television signals are separated and directed to an amplifier 102 and then to a coaxial cable output 14 for processing by an appropriate television receiver. A TV port enable signal is received along line 76 from microcomputer 30 to actuate the television reception upon proper authorization being established through the control data processing.

Figure 4:
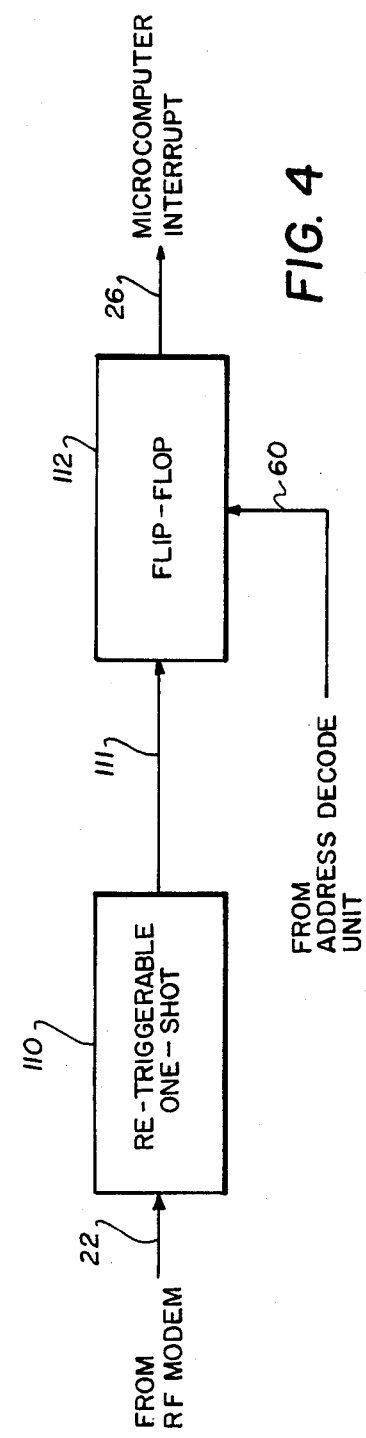
FIG. 4 is a block diagram of the interrupt control circuit shown in FIG. 1.

Looking at FIG. 4, interrupt control circuitry 24 is shown in more detail. Incoming data on line 22 is input to a retriggerable one-shot circuit 110 which outputs a pulse to a flip-flop 112 when a substantial change is determined in the transmission of data. Flip-flop 112 then directs an interrupt signal to central processor 30 along line 26 to notify the microcomputer 30 of the data transmission change.

In one preferred embodiment, one-shot circuit 110 monitors the incoming data and outputs a single pulse on line 111 if there is an absence of incoming data over a given period of time. This single pulse then triggers the appropriate interrupt signal to microcomputer 30. Thus, the presence or absence of data pulses over a given period of time may be detected by microcomputer 30 to signal a change in the type of data being directed to the terminal. This approach substantially increases the intelligence of the terminal by helping the microcomputer to interpret the transmissions by the amount of time space between the signal groups. An interrupt reset signal is received along line 60 from address decode unit 52 to shut off flip-flop 112 after the message has been received by microcomputer 30.

Figure 5:
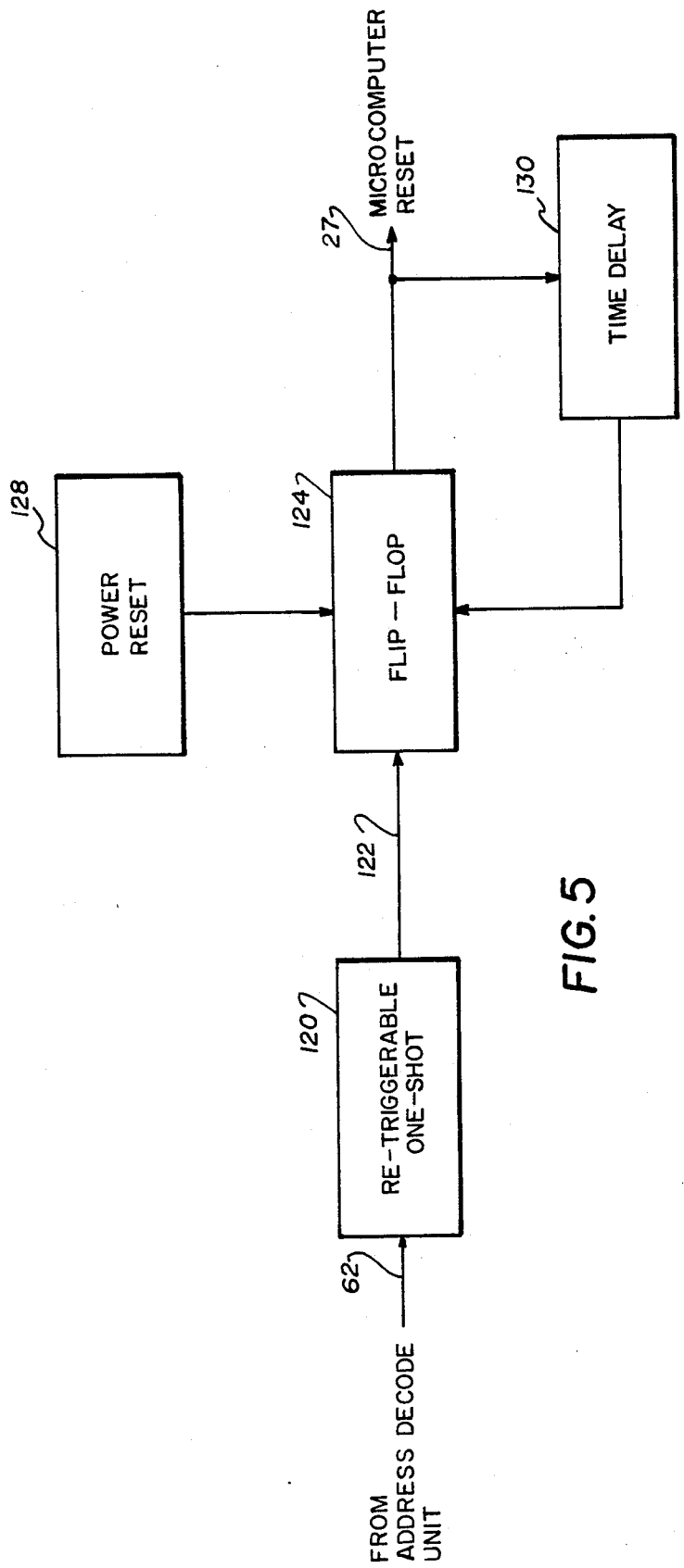
FIG. 5 is a block diagram of the power reset/watchdog timer circuitry shown in FIG. 1.

FIG. 5 shows the power reset/watchdog timer circuit 23 in more detail. Input pulses are directed from address decode unit 52 along line 62 to a retriggerable one-shot circuit 120. Output pulses from circuit 120 are directed along line 122 to a conventional flip-flop circuit 124 which in turn generates a reset signal on line 126 to microcomputer 30. A power reset circuit 128 provides a second input to flip-flop circuit 124 for initiating an output signal on line 126. The reset pulse is also fed back through a time delay circuit 130 to a reset input terminal on flip-flop 124.

As long as the microcomputer 30 and associated circuitry are operating properly, input pulses are fed periodically along line 62 to one-shot circuit 120. If an absence of pulses is detected over a predetermined period of time, an output signal is directed to flip-flop 124 to begin the reset signals to the microcomputer. Similarly, if power is turned off or on to the system, power reset circuit 128 inputs a signal to flip-flop 124 to begin the reset signal to microcomputer 30. Time delay circuit 130 simply resets flip-flop 124 after transmission of the reset pulse for a given period of time.

Figure 6:
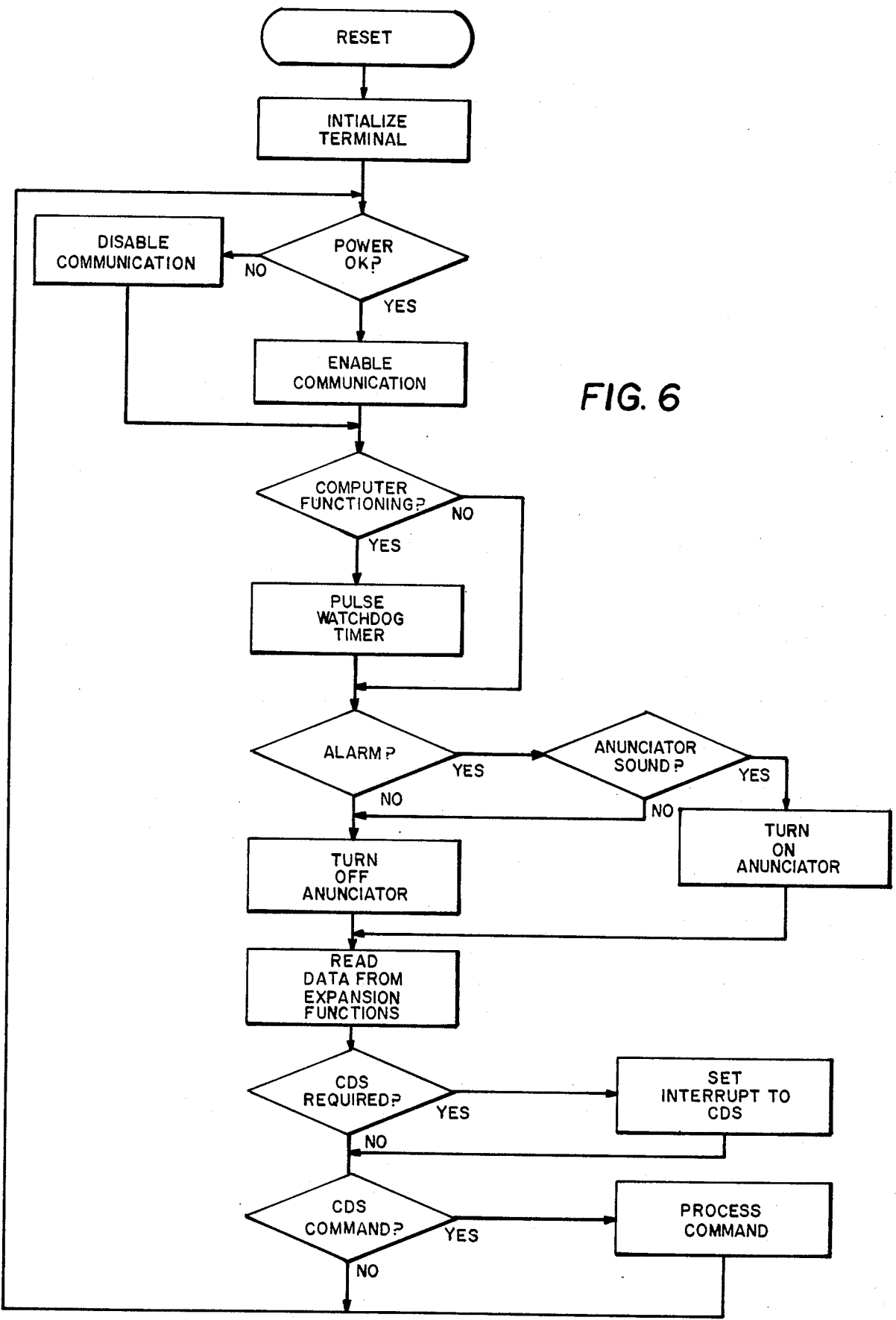
FIG. 6 is a flow diagram showing the internal procedure of operation of the data processing terminal shown in FIG. 1.

With reference to FIG. 6, a flow diagram is shown describing the normal procedure of the terminal system 10 with regard to its internal monitoring and control functions. The functions shown in FIG. 6 are embodied in the software programming of microcomputer 30 and describe its relationship with the other main units of system 10 shown in FIG. 1.

The procedure begins by resetting microcomputer 30 to initial predetermined values. A determination is made as to whether the level of power is sufficient for normal operation. If not, processing is disabled until power reaches the necessary level. Otherwise, processing is enabled and a determination is made as to whether the computer is functioning properly. If it is, a pulse is generated to be transmitted to power reset/watchdog timer circuit 23. If not, the pulse is omitted.

Microcomputer 30 then determines whether alarm data has been generated by one of alarm inputs 50. If so, a determination is made as to the type of alarm input data being received and the microcomputer decides whether an annunciator should be activated. If not, the annunciator is turned off in the event that it has previously been activated. Otherwise, the annunciator is activated and left on until the next cycle.

The microcomputer then reads whatever data may be present on data bus 80 regarding other types of data acquisition and control functions other than alarm functions. If special service or control is required from the central data system (CDS), an interrupt signal is queued for monitoring by the CDS in its normal interrogation routine. Next, a determination is made as to whether the CDS has sent command data which should be acted upon by the terminal. If so, the terminal processes the command data as instructed. In either event, the microcomputer then returns to the beginning of the main program.

Figure 7:
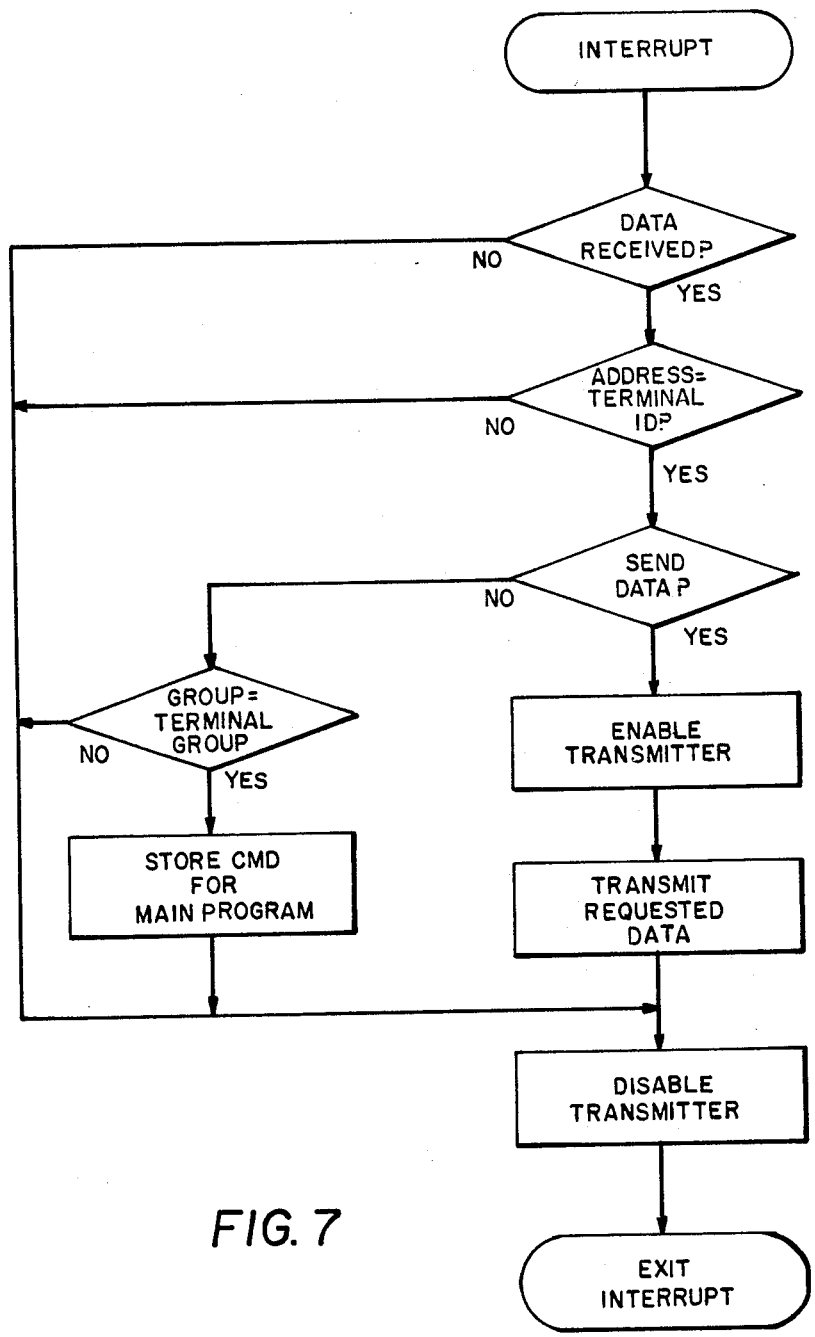
FIG. 7 is a flow diagram showing the interfacing procedure of operation of the terminal unit shown in FIG. 1 in communication with a central data processing system.

Looking now at FIG. 7, an interface routine is shown describing the communication procedure between the terminal system 10 of the present invention and its associated central data processing system. This routine begins by the generation of an interrupt signal by interrupt circuit 24 as previously described. At that point, a microprocessor 30 gives its attention to the data being received from the CDS. After a determination is made that data has been received, a comparison is made with the address portion of the data to determine whether it corresponds with the terminal identification code in master identification unit 46. If not, the transmitter is disabled and the interrupt routine ends. If so, the microcomputer 30 interprets the command data to determine whether it should receive or transmit data. If more data is to be received from the CDS, a determination is then made as to whether the terminal group matches the group number also stored in master identification unit 46. If so, the command data is stored for processing by the main program.

If the command from the CDS is for the terminal to send data rather than to receive it, the terminal transmitter is enabled and the requested data is transmitted to the CDS. The transmitter is then disabled and the interrupt routine is discontinued.

It should be understood that the practical implementation of the foregoing routines would be obvious to one skilled in the art given the previously described flow diagrams. It is also clear that other similar procedures may be implemented in the microcomputer of the present invention without departing from the scope of the invention.

It should also be apparent that the functions of the central data system and remote data system may be combined in a single central data system interfacing directly with the remote terminals. Such system would also fall within the scope of the present invention.

While there have been described what are at present considered to be preferred embodiments of the present invention, it will be obvious to those skilled in the art that various changes and modifications may be made therein without departing from the invention, and it is therefore intended to cover all such changes and modifications as follows in the spirit and scope of the present invention.

What is claimed is:

1. A remote data terminal for use in a data acquisition and control system having a central data processing system and a plurality of such data terminals, comprising:

data interface means for receiving data from said central data processing system and transmitting data to said central data processing system in a transmission format, including means for converting said data to a processing format compatible with the logic of said terminal;

microcomputer processing means for receiving data from said data interface means, for processing said data, for transmitting and receiving data to a common data bus in communication with said data interface means and for generating response data to be transmitted to said central data processing system;

identification means having an identification code for generating and transmitting data on said common data bus to said microcomputer means to identify said terminal;

data generating means for generating response data on said common data bus to said microcomputer means for transmitting to said central data processing system; and address decode means for generating control data to activate and deactivate said data interface means, said identification means and said data generating means.

2. The terminal of claim 1 wherein said data interface means comprises first conversion means for changing data received from said central processing system from a frequency modulated format to a digital format for processing by said microcomputer means and for changing data received from said microcomputer means from a digital format to a frequency modulated format to be transmitted to said central processing unit.

3. The terminal of claim 2 wherein said first conversion means comprises a frequency shift key receiver and a frequency shift key transmitter.

4. The terminal of claim 3 wherein said frequency shift key receiver modulates about a frequency of 158.55 megahertz and wherein said frequency shift key transmitter modulates about a frequency in the range of 18.2 megahertz to 30 megahertz.

5. The terminal of claim 1 wherein said data interface means further comprises second conversion means for converting serial bit data to parallel bit data and parallel bit data to serial bit data.

6. The terminal of claim 5 wherein said second conversion means comprises a universal asynchronous receiver/transmitter.

7. The terminal of claim 1 and further comprising interrupt means for notifying the microcomputer of time lapses in data received from the central processing system, including means for monitoring data received from the central processing system and means for generating an interrupt signal to said microcomputer means in response to the absence of said data over a predetermined period of time.

8. The terminal of claim 7 wherein said monitoring means comprises a retriggerable one-shot circuit having a single pulse output in the absence of said data over said predetermined period of time.

9. The terminal of claim 7 wherein said generating means comprises a flip-flop circuit responsive to said single pulse output of said one shot circuit to generate said interrupt signal.

10. The terminal of claim 1 and further comprising reset means for generating a reset pulse to change to parameters of said microcomputer means to initial predetermined values in response predetermined conditions in said microcomputer means.

11. The terminal of claim 10 wherein said reset means comprises a timer circuit responsive to periodic timing pulses generated by said microcomputer means to generate a reset pulse in response to the absence of said timing pulses over a predetermined period of time.

12. The terminal of claim 10 wherein said reset means further comprises a power reset circuit to generate a reset signal for said microcomputer means in response to terminal power fluxuations of a predetermined magnitude.

13. The terminal of claim 1 and further comprising means for controlling the access of a television receiver to the programming of a cable television network.

14. The terminal of claim 1 wherein said data generating means comprises alarm means having a plurality of data generating sensors.

15. A remote data terminal for use in a data acquisition and control system having a central processing system and a plurality of such data terminals, said terminal being utilized in a cable television distribution network having a television program source and a plurality of cable television receivers, comprising:

data interface means for receiving data from said central processing system and transmitting data to said central processing system in a transmission format, including means for converting said data to a processing format compatible with the logic of said terminal;

microcomputer processing means for receiving data from said data interface means, for processing said data, for transmitting and receiving data to a common data bus in communication with said data interface means and for generating authorization data to enable access by said receiver to the television network;

identification means having an identification code for generating and transmitting data on said common data bus to said microcomputer means to identify said terminal;

data generating means for generating response data on said common data bus to said microcomputer means for transmitting to said central data processing system;

address decode means for generating control data to activate and deactivate said data interface means and said identification means; and television port means in communication with said microcomputer means for enabling access by one of said television receivers to said cable television network in response to said authorization data from said microcomputer means.

16. The terminal of claim 15 wherein said data generating means generates response data providing a television channel number and a subscriber request to access said channel.

17. The terminal of claim 15 and further comprising means for decoding television data being received by said television receiver, said means being activated by the authorization data from the microcomputer means.

* * * * *

UNITED STATES PATENT AND TRADEMARK OFFICE
CERTIFICATE OF CORRECTION

PATENT NO. : 4,322,854

DATED : March 30, 1982

INVENTOR(S) : Allan B. Bundens and Carl F. Schoeneberger

It is certified that error appears in the above—identified patent and that said Letters Patent is hereby corrected as shown below:

On the cover page, lefthand column, at item 73 identifying the assignee, please cancel the identification in its entirety and substitute the following:
— Assignee: Tocom, Inc., Irving, Texas--.

Signed and Sealed this

Eighth Day of June 1982

[SEAL]

Attest:

GERALD J. MOSSINGHOFF

Attesting Officer     Commissioner of Patents and Trademarks